United States Patent [19]
Oltmanns et al.

[11] Patent Number: 6,034,969
[45] Date of Patent: Mar. 7, 2000

[54] METHOD AND SYSTEM FOR CROSS FRAME TRANSMIT COMBINING OF TRANSMIT SIGNALS

[75] Inventors: Michael Lee Oltmanns, Palatine; Duc Danh Dao, Buffalo Grove, both of Ill.

[73] Assignee: Motorola, Inc., Schaumburg, Ill.

[21] Appl. No.: 09/084,832

[22] Filed: May 26, 1998

[51] Int. Cl.[7] ...................................................... H04J 3/16
[52] U.S. Cl. ........................... 370/465; 370/342; 455/561
[58] Field of Search ..................................... 370/335, 342, 370/465, 468; 455/103, 561, 562

[56] References Cited

FOREIGN PATENT DOCUMENTS

WO 96/38015  11/1996  WIPO .

Primary Examiner—Chi H. Pham
Assistant Examiner—Maikhanh Tran
Attorney, Agent, or Firm—Sayed Hossain Beladi

[57] ABSTRACT

The present invention provides for a method and a system for combining into a single set of combined transmit signals (32) multiple sets of transmit signals (30) associated with different carrier bands or channels produced by a plurality of modem frames (12, 14) for increasing the traffic carrying capacity of a communication system without requiring an additional set of antennas. The present invention further provides for the cross frame combining of a plurality of modem frames (102, 104), while maintaining a high output power.

16 Claims, 4 Drawing Sheets

METHOD AND SYSTEM FOR CROSS FRAME TRANSMIT COMBINING OF TRANSMIT SIGNALS

FIELD OF THE INVENTION

The present invention relates generally to communication systems, and more specifically to combining transmit signals produced by a plurality of modem frames for increasing the traffic carrying capacity of a communication system without requiring an additional set of antennas.

BACKGROUND OF THE INVENTION

Wireless communication systems have the ability to support a finite amount of call traffic often referred to as a system's bandwidth. Each call made by a subscriber of a system places a demand on the available bandwidth. As the number of calls made by subscribers rises, the amount of cellular call traffic increases, using more and more of the available bandwidth. Because subscribers expect to be able to make calls on demand, as the volume of call traffic in an area increases, it may become necessary to expand the system's traffic throughput to insure subscriber expectations are met.

For systems making use of CDMA (Code Division Multiple Access) technology, system bandwidth can be increased by making use of additional carrier bands or channels. Each CDMA channel or carrier makes use of a frequency bandwidth of approximately 1.25 MHz. To increase the number of CDMA channels being used often requires the use of additional equipment. However because of customer or space requirements it may not always be conveniently possible to support the use of additional equipment.

Presently one modem frame provides support for up to four CDMA channels. In order to support a greater number of CDMA channels a second modem frame could be used. Unfortunately it is not always possible to install a second set of antennas to support the second modem frame. Therefore a cross modem frame combining technique that would allow an additional modem frame to be integrated into the system without requiring an additional set of antennas would be beneficial.

DETAILED DESCRIPTION OF THE PREFERRED EMBODIMENT

The present invention provides for a method and a system for combining the multiple sets of transmit signals produced by a plurality of modem frames into a single set of combined transmit signals for routing to a single set of antennas.

A preferred aspect of the present invention further provides for the additional modem frame to be integrated so as to maintain a high output power level of the transmitted signals.

Stated more specifically a method is provided for combining multiple sets of transmit signals from a plurality of modem frames for use with a single set of antennas. The method comprises the steps of receiving at each one of the plurality of modem frames message and signaling data and producing in each one of the plurality of modem frames a set of transmit signals comprising one or more transmit signals. The method then provides for combining corresponding transmit signals from each of the sets of transmit signals produced by the plurality of modem frames into a single set of combined transmit signals, and routing the single set of combined transmit signals to the single set of antennas.

Furthermore a system is provided for combining multiple sets of transmit signals comprising a first modem frame for receiving message and signaling data and producing a set of transmit signals including one or more transmit signals, one or more additional modem frames for receiving message and signaling data and producing additional corresponding sets of transmit signals including one or more transmit signals, and a single set of antennas. The first modem frame includes a combiner circuit coupled to the one or more additional modem frames and the single set of antennas for receiving at least some of the transmit signals from the sets of transmit signals produced by the one or more additional modem frames, combines them with at least some of the transmit signals produced by the first modem frame and routes the combined transmit signals to the single set of antennas.

Figure 1:
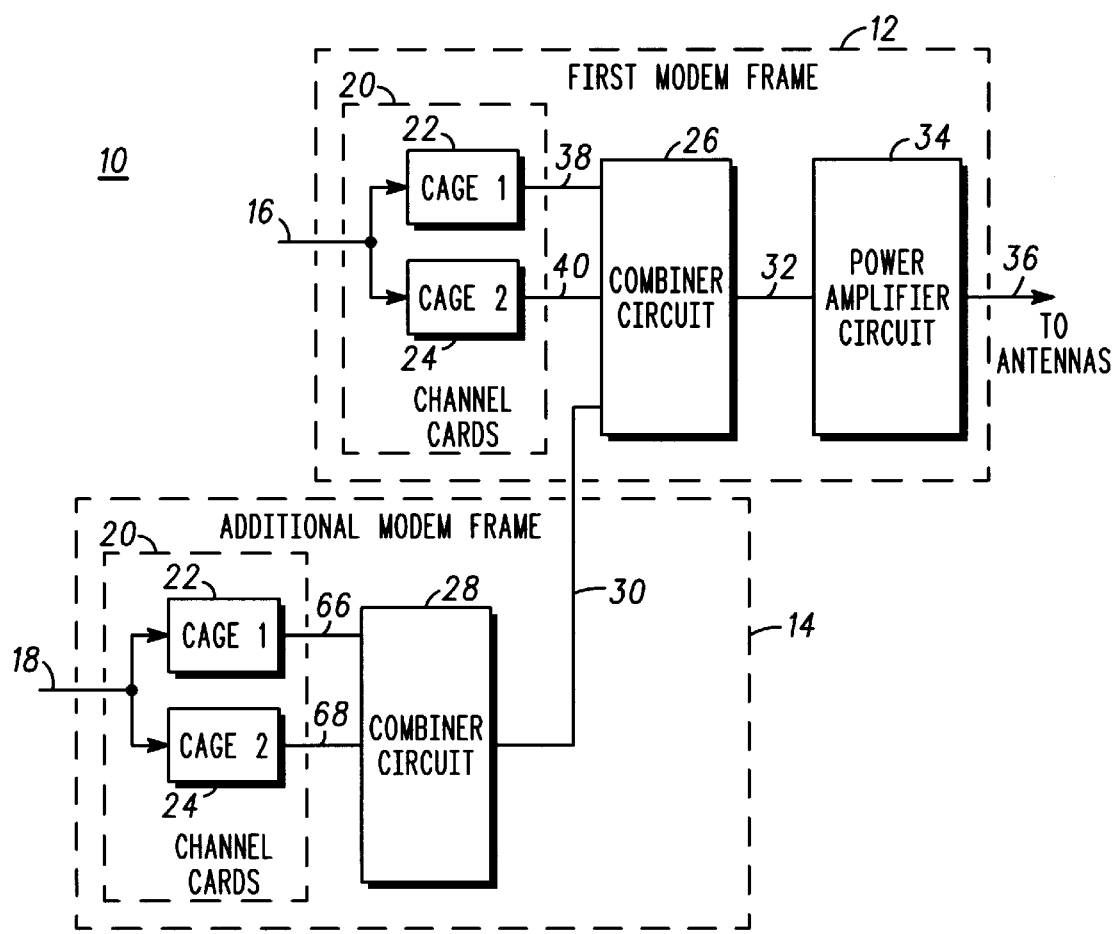
FIG. 1 is a block diagram generally depicting a system for combining multiple sets of transmit signals in accordance with the present invention.

Referring now to the drawings in greater detail, there is generally depicted in FIG. 1 a block diagram of a system 10 for combining multiple sets of transmit signals in accordance with the present invention. The system shown in FIG. 1 provides for a first modem frame 12 and an additional modem frame 14. In the preferred embodiment each modem frame is capable of supporting up to four CDMA carriers or channels. The first modem frame 12 and the additional modem frame 14 each receive message and signaling data, at inputs 16 and 18, respectively, and correspondingly produce a set of transmit data.

Specifically in each of the modem frames 12 and 14 the message and signaling data is received by a bank of channel cards 20, which properly format and modulate the received data for transmission over the proper frequencies. In the preferred embodiment, the bank of channel cards 20 in each of the two modem frames 12 and 14 are arranged in two cages, cage one 22 and cage two 24, which operate in parallel. Once modulated, the signals in each modem frame 12 and 14 are forwarded to respective combiner circuits 26 and 28 for producing a set of transmit signals.

Each transmit signal produced contains the signals to be routed to one of the antennas in the set of antennas, wherein each of the antennas correspond to a separate transmission sector. In at least one specific embodiment, the set of antennas includes six separate antennas for supporting six transmission sectors.

Previously the set of transmit signals produced in each modem frame would be routed to its own separate set of antennas. However to avoid the need to install a second set of antennas, especially where customer and space requirements would make it difficult to install a second set, the transmit signals are combined to form a single set of transmit signals.

In a first embodiment this is accomplished by routing the set of transmit signals 30 produced in the combiner circuit 28 of the additional modem frame 14 to the combiner circuit 26 of the first modem frame 12. In the combiner circuit 26 of the first modem frame 12, transmit signals from each of the two modem frames 12 and 14 containing transmit signals to be broadcast to the same sectors are combined to form a single combined set of transmit signals 32. From the combiner circuit 26 the combined set of transmit signals are routed to a power amplifier circuit 34, wherein the resulting amplified combined set of transmit signals 36 are correspondingly routed to the set of antennas. By producing a single combined set of transmit signals, a single set of antennas can be used to support multiple modem frames.

Figure 2:
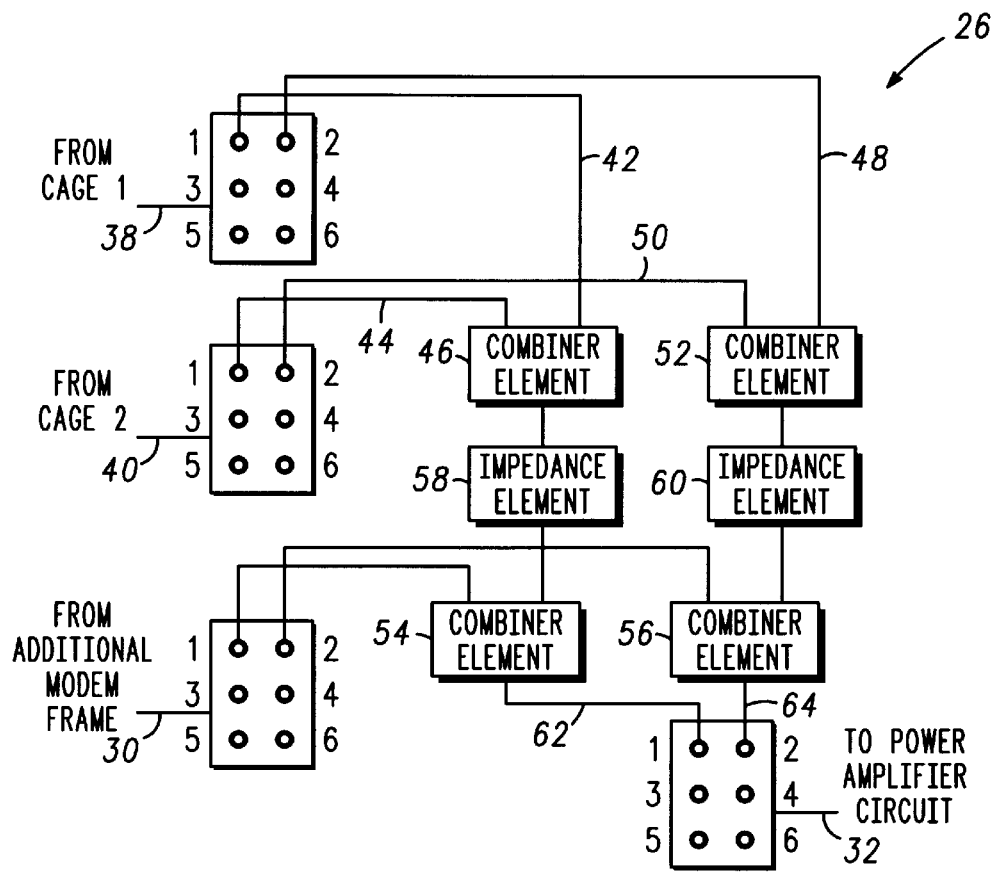
FIG. 2 is a partial block diagram generally depicting a combiner circuit of the first modem frame, for use in the system shown in FIG. 1.

Referring to FIG. 2, there is illustrated a partial block diagram providing a more detailed description of a combiner circuit 26 for use in the first modem frame 12 shown in FIG. 1. The block diagram is a partial block diagram to the extent that the block diagram only illustrates the circuitry for processing the transmit signals corresponding to two of the six transmission sectors. The circuitry for processing the transmit signals corresponding to the other four transmission sectors is effectively identical to the circuitry shown for the first two, and therefore the equivalent features have not been shown.

The combiner circuit 26 receives a set of signals 38 and 40 from each cage 22 and 24 of channel cards 20 from the first modem frame 12. Wherein the specific embodiment illustrates six signals being received from each cage 22 and 24 of channel cards 20, a greater or lesser number of signals could be received which would be largely dependent on the number of transmission sectors.

The first signal 42 from cage one 22 and the first signal 44 from cage two 24 are coupled to a combiner element 46. Correspondingly the second signal 48 from cage one 22 and the second signal 50 from cage two 24 are coupled to a combiner element 52. The signals are merged by the respective combiner elements 46 and 52, producing a set of transmit signals corresponding to the first modem frame 12. The signals produced by combiner elements 46 and 52 are then coupled to a second set of combiner elements 54 and 56, so that the set of transmit signals corresponding to the first modem frame 12 can be combined with the set of transmit signals 30 received from and corresponding to the additional modem frame 14.

The outputs of combiner elements 46 and 52 are coupled to the second set of combiner elements 54 and 56, via impedance elements 58 and 60. The impedance elements 58 and 60 are designed to compensate for the differences in impedance associated with differences in the signal paths of the transmit signals. The differences in impedance largely resulting from the additional cabling and connections associated with routing the set of transmit signals 30 from the additional modem frame 14 to the first modem frame 12.

The second set of combiner elements 54 and 56 produce two of the combined transmit signals 62 and 64 forming the single combined set of transmit signals 32, which is coupled to the power amplifier circuit.

Figure 3:
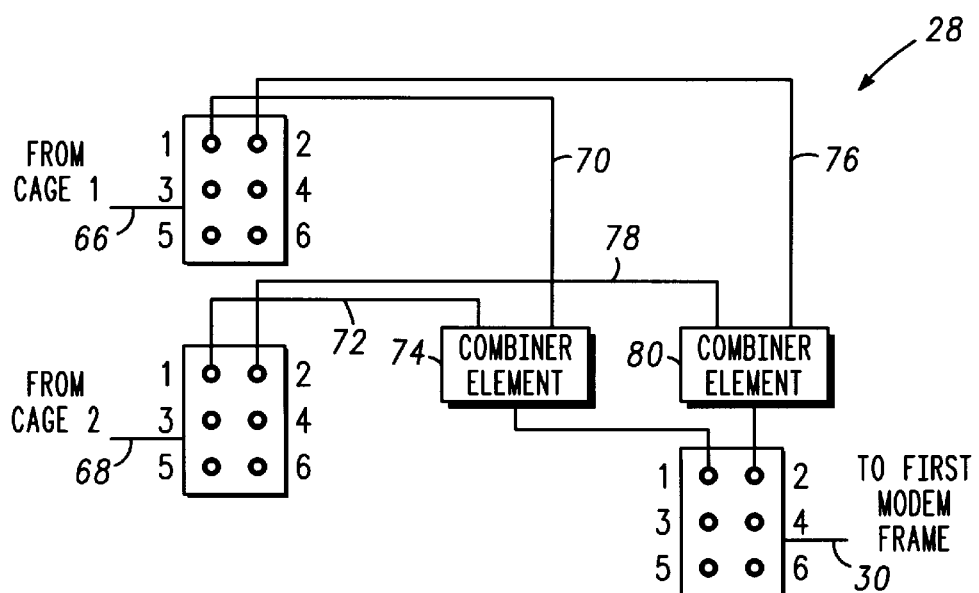
FIG. 3 is a partial block diagram generally depicting a combiner circuit of the additional modem frame, for use in the system shown in FIG. 1.

Referring to FIG. 3, there is illustrated a partial block diagram providing a more detailed description of a combiner circuit 28 for use in the additional modem frame 14 shown in FIG. 1. Similar to the combiner circuit 26, shown in FIG. 2, the combiner circuit 28 only shows the circuitry for processing the transmit signals corresponding to two of the six transmission sectors.

The combiner circuit 28 receives a set of signals 66 and 68 from each cage 22 and 24 of channel cards 20 from the additional modem frame 14. The first signal 70 from cage one 22 and the first signal 72 from cage two 24 are coupled to a combiner element 74. Correspondingly the second signal 76 from cage one 22 and the second signal 78 from cage two 24 are coupled to a combiner element 80. The signals are merged by the respective combiner elements 74 and 80, so as to produce a set of transmit signals 30 corresponding to the additional modem frame 14. The set of transmit signals 30 corresponding to the additional modem frame 14 are then coupled to the combiner circuit 26 of the first modem frame 12 wherein they are combined with a set of signals corresponding to the first modem frame 12 into a single set of combined transmit signals.

Figure 4:
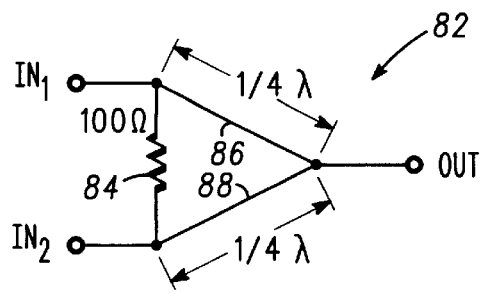
FIG. 4 is a circuit schematic generally depicting a combiner element for use in the combiner circuits shown in FIGS. 2 and 3.

Referring now to FIG. 4 is a circuit schematic 82 corresponding to the combiner element shown in FIGS. 2 and 3 for use in the combiner circuits 26 and 28. Specifically, the circuit schematic 82 for the combiner element represents what is commonly referred to as a Wilkenson combiner, and is used to combine two input signals received at inputs $IN_1$ and $IN_2$ having equivalent power to form a single output signal at output OUT having a power equivalent to the sum of the two input signals.

Shown coupled between the two inputs $IN_1$ and $IN_2$ is an optional resistor which is used to absorb reflected power caused by imbalances in the combiner. The value of the resistor should be two times the value of the characteristic impedance of the inputs and the output, and should be non-inductive. In the preferred embodiment the characteristic impedance associated with the inputs and the output is 50 ohms and therefore the resistor should have a value of 100 ohms.

Each of the inputs $IN_1$ and $IN_2$ are coupled to the output OUT via a corresponding stripline conductor 86 and 88 having a length of one quarter wavelength and a characteristic impedance equivalent to the characteristic impedance associated with the input/output multiplied by the square root of two, or approximately 70.7 ohms.

Figure 5:
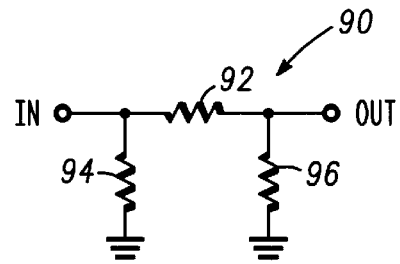
FIG. 5 is a circuit schematic generally depicting an impedance element for use in the combiner circuit shown in FIG. 2.

Referring to FIG. 5 is a circuit schematic 90 corresponding to the impedance element shown in FIG. 2 for use in the combiner circuit 26. The circuit schematic 90 provides for a X resistor network, wherein the input IN is coupled to the output OUT via resistor 92, the input IN is further coupled to ground via resistor 94, and the output OUT is coupled to ground via resistor 96. The impedance element increases the resistance of certain signal paths, so as to eliminate differences in impedance, largely resulting from some of the signal paths containing additional cabling and connections associated with routing transmit signals from one modem frame to another. The particular values of the resistor elements being dependent upon the amount of additional impedance required to equalize the signal loss between the signals to be combined.

One result of the embodiment shown in FIG. 1, which routes the transmit signals for all six sectors to a single power amplifier circuit associated with a single modem frame, results in the power amplification circuit providing power amplification for the transmit signals of double the number of carriers. While this will continue to provide sufficient power for many applications, in some applications a single power amplifier circuit may be insufficient for producing a level of amplification required for meeting the needs of the customer. Therefore the present invention provides for an additional embodiment making use of additional power amplification.

Figure 6:
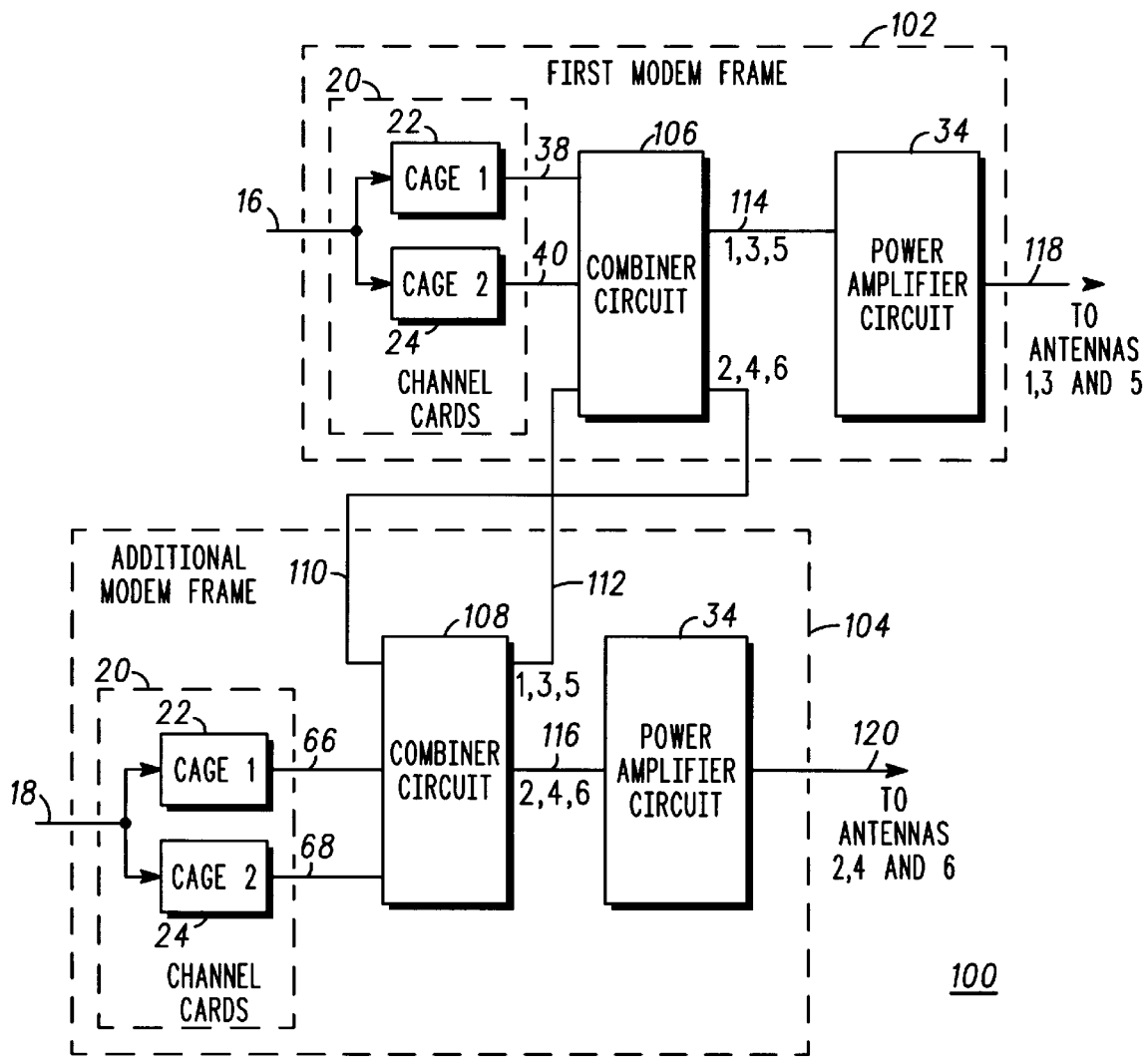
FIG. 6 is a block diagram generally depicting an alternative embodiment of the system for combining multiple sets of transmit signals in accordance with the present invention.

FIG. 6 is a block diagram generally depicting an alternative embodiment of the system for combining multiple sets of transmit signals in accordance with the present invention. FIG. 6 allows for the use of an additional power amplifier circuit associated with the additional modem frame for providing a method and system for cross frame transmit combining of additional modem frames in order to maintain the power levels of a site, so as to be equivalent with a site with only one power amplifier circuit and the transmit signals from one modem frame.

The system 100 shown in FIG. 6 is similar to the embodiment of the system 10 shown in FIG. 1, wherein like elements are similarly numbered. The system 100 shown in FIG. 6, provides for a power amplifier circuit 34 in the additional modem frame 104, and different combiner circuits 106 and 108 in both the first modem frame 102 and the additional modem frames 104.

System 100 shown in FIG. 6 functionally differs from system 10, shown in FIG. 1, in that wherein system 10 provides for the transmit signals associated with all of the sectors to be routed from the additional modem frame 14 to the first modem frame 12 for combining in the first modem frame 12, system 100 routes only some of the transmit signals from the additional modem frame 104 to the first modem frame 102, and routes the remaining transmit signals of the first modem frame 102, not corresponding to transmit signals received from additional modem frame 104, from the first modem frame 102 to the additional modem frame 104, for combining transmit signals in both modem frames.

Specifically in the preferred embodiment, combiner circuit 106 of the first modem frame 102 routes the transmit signals 110 corresponding to the even numbered transmission sectors to the combiner circuit 108 of the additional modem frame 104. The combiner circuit 108 of the additional modem frame 104 routes the transmit signals 112 corresponding to the odd numbered transmission sectors to the combiner circuit 106 of the first modem frame 102. Consistent with system 10, shown in FIG. 1, a single combined set of transmit signals is formed, however half of the combined set of transmit signals are produced in each of the combiner circuit 106 and 108 of modem frames 102 and 104.

From the combiner circuits 106 and 108 the combined set of transmit signals 114 and 116 are routed to respective power amplifier circuits 34 located in each of the modem frames 102 and 104, and the resulting amplified combined set of transmit signals 118 and 120 are routed to the set of antennas.

Figure 7:
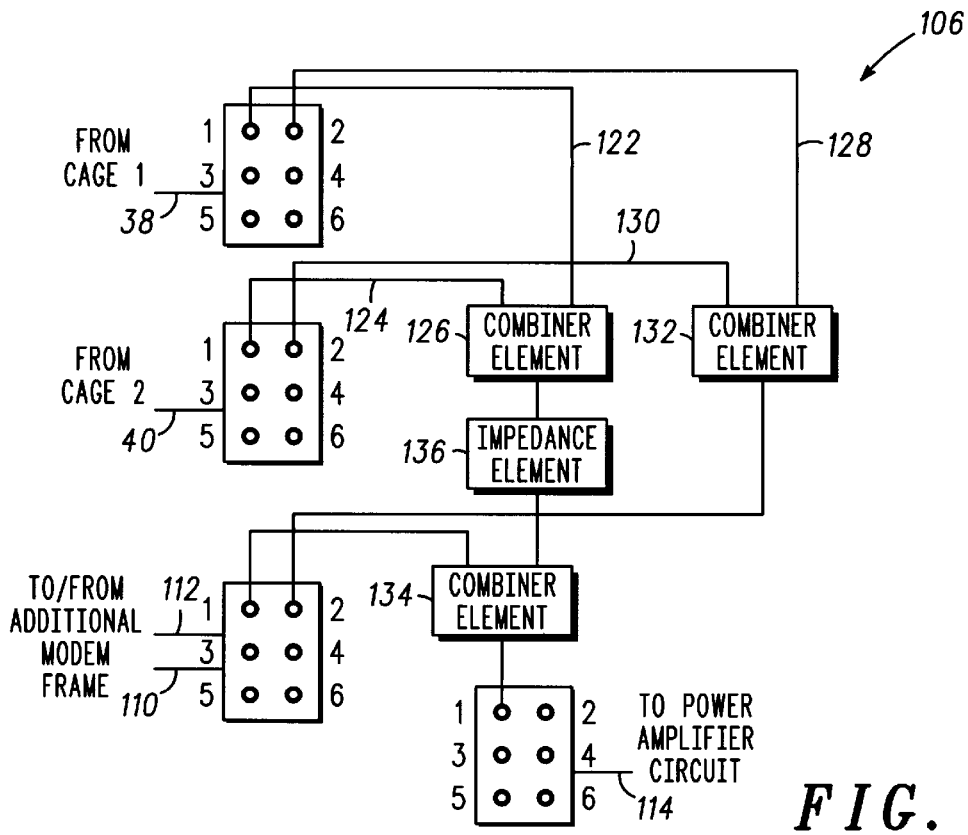
FIG. 7 is a partial block diagram generally depicting a combiner circuit of the first modem frame, for use in the system shown in FIG. 6.

FIG. 7 is a partial block diagram providing a more detailed description of a combiner circuit 106 for use in the first modem frame 102 shown in FIG. 6. Similar to the combiner circuit 26, shown in FIG. 1, the combiner circuit 106 receives a set of signals 38 and 40 from each cage 22 and 24 of channel cards 20 from the first modem frame 102. The first signal 122 from cage one 22 and the first signal 124 from cage two 24 are coupled to a combiner element 126. Correspondingly the second signal 128 from cage one 22 and the second signal 130 from cage two 24 are coupled to a combiner element 132. The signals are merged by the respective combiner elements 126 and 132, so as to produce a set of transmit signals corresponding to the first modem frame 102. The signals for sectors three through six are similarly merged but not shown.

The outputs of the combiner elements 126 associated with the odd numbered sectors are coupled to a second set of combiner elements 134, via an impedance element 136 in order that the set of transmit signals for the odd numbered sectors of the first frame 102 can be combined with the set of transmit signals 112 corresponding to the odd numbered sectors received from the additional modem frame 104. The outputs of the combiner elements 132 associated with the even numbered sectors are alternatively routed to the additional modem frame 104. The combined set of transmit signals 114 formed in the combiner circuit 106 of the first modem frame 102, namely the combined transmit signals 114 for the odd numbered sectors, are routed to the power amplifier circuit 34 of the first modem frame 102. The resulting amplified combined transmit signals 118 for the odd numbered sectors are then routed to the corresponding antennas from the single set of antennas.

Figure 8:
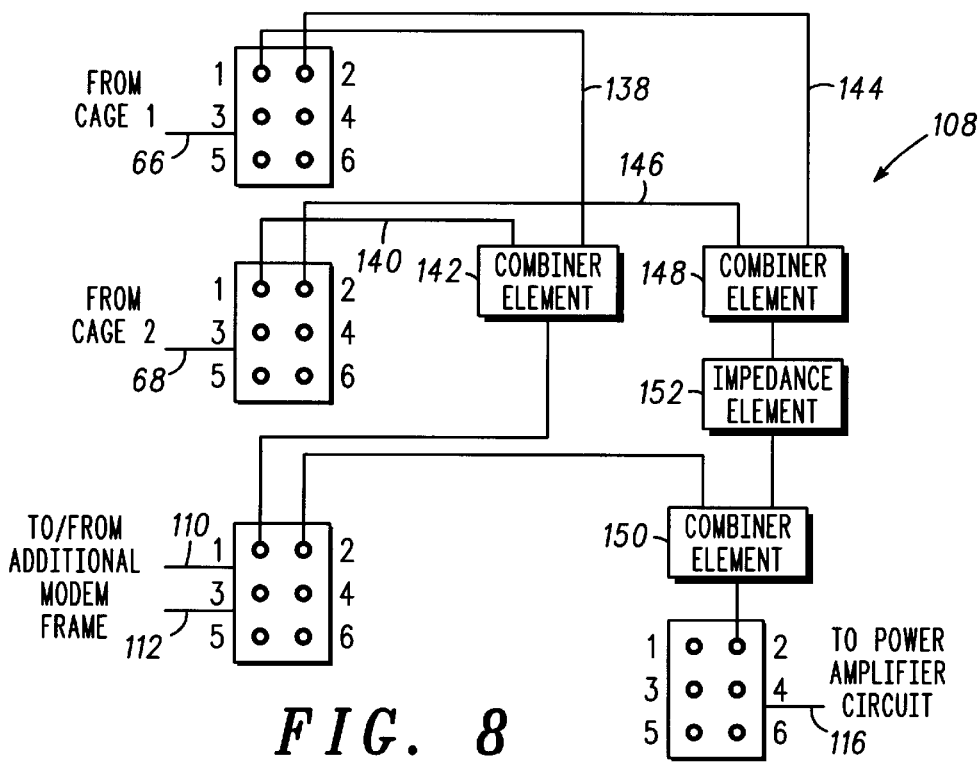
FIG. 8 is a partial block diagram generally depicting a combiner circuit of the additional modem frame, for use in the system shown in FIG. 6.

FIG. 8 is a partial block diagram providing a more detailed description of a combiner circuit 108 for use in the additional modem frame 104 shown in FIG. 6. The combiner circuit 108 is almost a mirror image of the combiner circuit 106 shown in FIG. 7, wherein the circuitry associated with the signals corresponding to the odd number sectors in the additional modem frame 104 is equivalent to the circuitry associated with the even number sectors in the first modem frame 102, and the circuitry associated with the signals corresponding to the even number sectors in the additional modem frame 104 is equivalent to the circuitry associated with the odd number sectors in the first modem frame 102.

Specifically, the combiner circuit 108, similar to the combiner circuit 28 shown in FIG. 1, receives a set of signals 66 and 68 from each cage 22 and 24 of channel cards 20 from the additional modem frame 104. The first signal 138 from cage one 22 and the first signal 140 from cage two 24 are coupled to a combiner element 142. Correspondingly the second signal 144 from cage one 22 and the second signal 146 from cage two 24 are coupled to a combiner element 148. The signals are merged by the respective combiner elements 142 and 148, so as to produce a set of transmit signals corresponding to the additional modem frame 104. The signals for sectors three through six are similarly merged but not shown.

The outputs of the combiner elements 148 associated with the even numbered sectors are coupled to a second set of combiner elements 150, via an impedance element 152 in order that the set of transmit signals for the even numbered sectors of the additional frame 104 can be combined with the set of transmit signals 110 corresponding to the even numbered sectors received from the first modem frame 102. The outputs of the combiner elements 142 associated with the odd numbered sectors are alternatively routed to the first modem frame 102. The combined set of transmit signals 116 formed in the combiner circuit 108 of the additional modem frame 104, namely the combined transmit signals 116 for the even numbered sectors, are routed to the power amplifier circuit 34 of the additional modem frame 104. The resulting amplified combined transmit signals 120 for the even numbered sectors are then routed to the corresponding antennas from the single set of antennas.

In the preferred embodiment, the combiner elements and the impedance elements shown in FIGS. 7 and 8 makes use of the circuitry of circuit schematics 82 and 90 described in connection with FIGS. 4 and 5.

By making use of an additional power amplifier circuit 34 in the additional modem frame 104 for amplifying one half of the combined transmit signals prior to them being routed to the single set of antennas, the power output levels are maintained at a level equivalent to a single modem frame making use of a single power amplifier circuit.

From the foregoing description, it will be apparent that the method and system for cross frame transmit combining of the present invention has a number of advantages, some of which have been described above and others of which are inherent in the invention. Also it will be understood that modifications can be made to the method and system described above without departing from the teachings of the invention.

What we claim is:

1. A method for combining multiple sets of transmit signals from a plurality of modem frames for use with a single set of antennas comprising the steps of:

receiving at each one of the plurality of modem frames message and signaling data;

producing in each one of the plurality of modem frames a set of transmit signals comprising one or more transmit signals;

combining corresponding transmit signals from each of the sets of transmit signals produced by the plurality of modem frames into a single set of combined transmit signals, wherein the step of combining includes inserting an impedance element into the signal path of some of the transmit signals, for compensating for inherent differences in the characteristic impedance's of the signal path and equalize the signal loss between the signals to be combined; and routing the single set of combined transmit signals to the single set of antennas.

2. The method of claim 1, wherein the single set of antennas includes one or more antennas for transmitting to a corresponding one of one or more sectors, wherein the step of combining corresponding transmit signals includes combining transmit signals containing message and signaling data to be transmitted to the same sector, and wherein the step of routing the single set of combined transmit signals includes routing each of the combined transmit signals containing message and signaling data to be transmitted to the same sector to the corresponding antenna.

3. The method of claim 1, wherein the step of combining includes routing the transmit signals to the same one of the plurality of modem frames for combining the transmit signals within the same modem frame.

4. The method of claim 2, wherein the step of combining includes routing the transmit signals to more than one modem frame, wherein all of the transmit signals containing message and signaling data to be transmitted to a particular sector are routed to the same modem frame for combining.

5. The method of claim 1, further comprising the step of, before routing the single set of combined transmit signals to the single set of antennas, amplifying the set of combined transmit signals.

6. The method of claim 4, further comprising the step of, before routing the combined set of transmit signals to said single set of antennas, amplifying each of the combined transmit signals in the modem frame in which the signal is combined.

7. A system for combining multiple sets of transmit signals comprising:

a first modem frame for receiving message and signaling data and producing a set of transmit signals including one or more transmit signals;

one or more additional modem frames for receiving message and signaling data and producing additional corresponding sets of transmit signals including one or more transmit signals; and a single set of antennas; and wherein the first modem frame includes a combiner circuit coupled to the one or more additional modem frames and the single set of antennas for receiving at least some of the transmit signals from the sets of transmit signals produced by the one or more additional modem frames, combining them with at least some of the transmit signals produced by the first modem frame and routing the combined transmit signals to the single set of antennas, and wherein the combiner circuit includes combiner elements for merging transmit signals, and impedance elements for adjusting the characteristic impedance of the signal paths of the transmit signals for equalizing the signal loss between the transmit signals prior to the signals being combined.

8. The system of claim 7, wherein the first modem frame and the one or more additional modem frames, each include a plurality of channel cards for producing the transmit signals.

9. The system of claim 7, wherein the single set of antennas includes one or more antennas, each antenna for transmitting to a corresponding one of one or more sectors.

10. The system of claim 9, wherein the combiner circuit combines transmit signals containing message and signaling data to be transmitted to the same sector for subsequent routing to the appropriate antenna.

11. The system of claim 7, wherein the combiner circuit of the first modem frame receives all of the transmit signals from the sets of transmit signals produced by the modem frames, combining them with the transmit signals produced by the first modem frame.

12. The system of claim 10, wherein at least one of the one or more additional modem frames includes a combiner circuit coupled to the first modem frame, all of the any other additional modem frames and the single set of antennas for receiving all of the transmit signals containing message and signaling information to be transmitted to a particular sector for combining and routing to the appropriate antenna.

13. The system of claim 7, wherein the first modem frame additionally includes a power amplifier circuit coupled to the combiner circuit for amplifying the combined transmit signals before routing them to the single set of antennas.

14. The system of claim 12, wherein the first modem frame and each of the at least one or more additional modem frames that includes a combiner circuit includes a power amplifier circuit coupled to the corresponding combiner circuit for amplifying the combined transmit signals in the modem frame in which the signals are combined before routing them to the single set of antennas.

15. The system of claim 7, wherein the combiner elements are each comprised of a Wilkenson combiner.

16. The system of claim 7, wherein the impedance elements are each comprised of a resistor network.

\* \* \* \* \*